No. 674,282.  
W. C. POPE.  
PLOW.  
(Application filed May 8, 1899.)  
Patented May 14, 1901.
(No Model.)
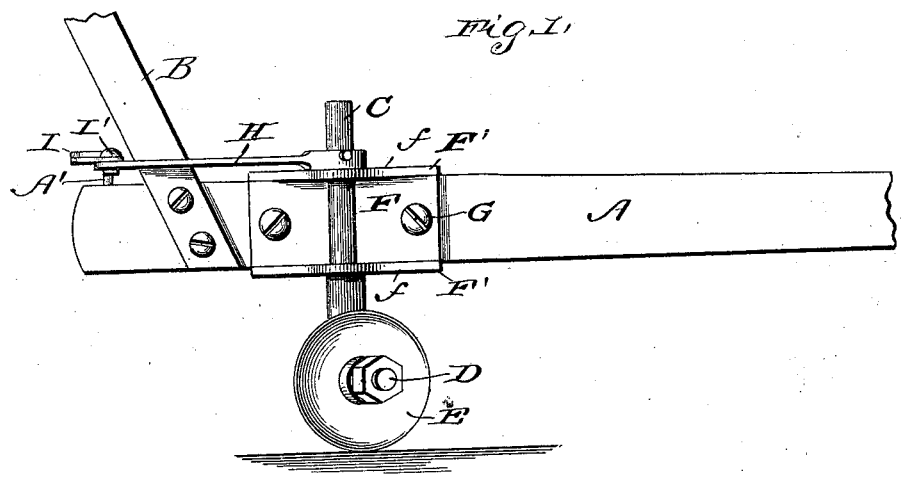
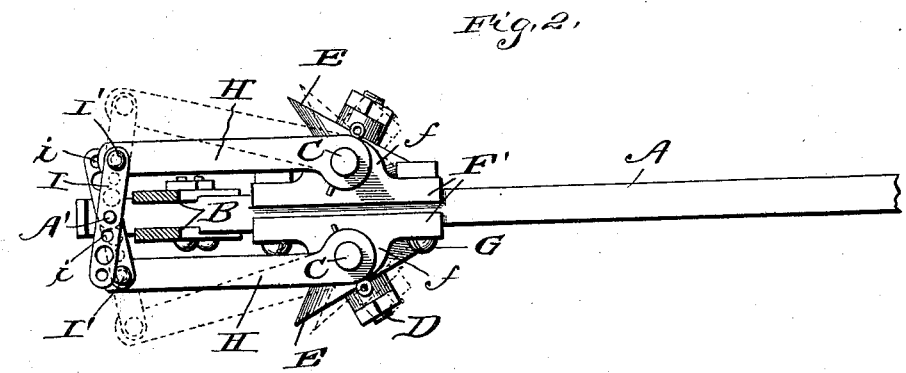

UNITED STATES PATENT OFFICE.

WILLIAM CLINTON POPE, OF KINGSFORD, FLORIDA.

PLOW.

SPECIFICATION forming part of Letters Patent No. 674,282, dated May 14, 1901.

Application filed May 8, 1899. Serial No. 716,071. (No model.)

*To all whom it may concern:*

Be it known that I, WILLIAM CLINTON POPE, a citizen of the United States, residing at Kingsford, in the county of Polk and State of Florida, have made certain new and useful Improvements in Disk Cultivators for Cotton, of which the following is a specification.

My invention is a plow for use in working cotton the first time; and it consists in certain novel constructions and combinations of parts, as will be hereinafter described and claimed.

In the drawings, Figure 1 is a side view, and Fig. 2 a top plan view, of a plow embodying my invention.

By my invention I provide a plow or cultivator embodying two disks which run on opposite sides of the row, together with devices whereby the angle of the disks to the row can be varied to make the disks run deep or shallow, as the case may require.

In the construction shown I employ a beam or support A, which may be in the form of a common plow-beam, having the handles B, by which it may be manipulated. In suitable supports connected with said beam A, I journal vertically the shafts C, which have at their lower ends the lateral arms D, forming spindles on which are journaled the disks E, and the shafts C may be turned to vary the angle of the disks E as may be desired. By preference the supports for the shafts C are in the form of blocks or castings F, bolted at G to the beam and provided at their upper and lower edges with flanges F', which overlap the upper and lower sides of the stock A. The plates F are also provided with flanges $f$, which are perforated vertically in line with each other to form bearings for the shafts C.

The arms H are connected at their forward ends with the upper ends of the shafts C and extend rearwardly therefrom and have pivotally connected to their rear ends the outer ends of links I. These links I extend inwardly from their connection at I' with the arms H and are provided at $i$ with a series of perforations which may fit over the pin A' on the stock to secure the arms H in any desired adjustment, and thus operate to secure the shafts C and the disks carried thereby at any desired inclination.

The invention is simple, easily operated, and can be readily applied to an ordinary plow stock or beam by the application thereto of the pin A' and the blocks or castings F in the manner shown in the accompanying drawings.

In order to change the angle of the disks, it is only necessary to lift the links I from the pin A', adjust the arms H as desired, and resecure the links I by connection with the pin A', as will be readily understood from the drawings.

Having thus described my invention, what I claim as new, and desire to secure by Letters Patent, is—

1. In a plow substantially as described, the combination of a disk and its vertical shaft, a block having on one side flanges provided with bearings for the shaft, and provided at its opposite side with flanges to overlap a plow stock or beam, substantially as set forth.

2. The combination substantially as described, of the beam or support, the vertically-journaled shafts on opposite sides thereof and provided with disks, the arms extending from said shafts, the links connected with the arms and perforated, and the pin or projection on the beam or support to engage in the perforation of the links, substantially as set forth.

3. The improvement in plows herein described comprising the beam or support, the blocks fitted on opposite sides of and secured to said beam and provided with vertical bearings, the shafts journaled in said bearings and provided with disks, the arms connected with said shafts, and the links connected with the arms and arranged to secure the same to the beam or support in different adjustments, substantially as set forth.

WILLIAM CLINTON POPE.

In presence of—
 C. A. BOSWELL,
 E. TUCKER.